Feb. 10, 1931.          P. B. DRANE          1,791,862
AUTOMATIC VAPOR CHECK VALVE
Filed March 7, 1930

INVENTOR.
PHILIP B. DRANE
BY U. G. Charles
ATTORNEY.

Patented Feb. 10, 1931

1,791,862

UNITED STATES PATENT OFFICE

PHILIP B. DRANE, OF WICHITA, KANSAS

AUTOMATIC VAPOR CHECK VALVE

Application filed March 7, 1930. Serial No. 433,948.

My invention relates to an automatic vapor check valve.

The object of my invention is to provide a valve that will function for the relief of vacuum or compression and at the same time maintain a pressure.

A further object of my invention is to provide a valve gravity actuated for the relief of compression and a second valve associated therewith to relieve the vacuum strain, the said valves coacting for their respective purposes.

A further object of my invention is to provide a valve having a fireproof feature associated therewith, and functioning as a seat for a receptor as a means for conveniently testing the gravity of the oil and by which means the top of the tank is protected against superfluous oil deposit from the tank for testing purposes.

A still further object of my invention is to provide a valve inexpensive to manufacture, simple to install, having the desired efficiency and preferably made of aluminum.

A still further object of my invention is to provide a governing means to insure the closing of the fire screen prior to the closing of the lid; the closed position of the lid functioning as a lock to avoid opening of the screen.

These and other objects will be hereinafter more fully explained reference being had to the accompanying drawings forming a part of the specification and in which like characters will apply to like parts in the different views.

Referring to the drawings.

Figure 1:
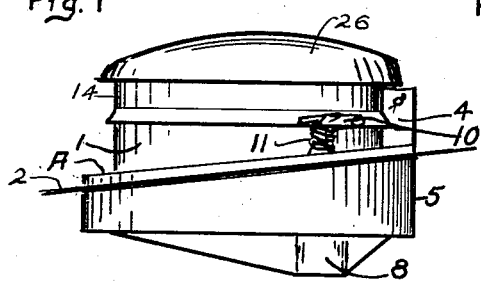
Fig. 1 is a side elevation of the valve.

My invention herein disclosed consists of an annular body member 1, having a flange A, integrally connected thereto, by which means the said member is firmly attached to the top of an oil tank 2, the joint being made air tight by a gasket 3, positioned between the flange and the said tank top and being securely attached by bolts or rivets engaging in apertures B, passing through the flange and registering with similar apertures passing through the tank. It will be understood that the top of an ordinary tank such as commonly used in the oil field is crowned, consequently to maintain a perpendicular position of the body element, a flange portion is slantingly arranged to conform to the crown of the tank top.

Positioned on the side of the annular body and radially extending therefrom and integrally connected therewith is an ear 4, to which the lid is hingedly connected.

As a fireproof means to avoid flames from entering the tank by possible ignition of the vapor fumes through the valve, I have provided an annular neck member 5, the inside diameter of which is greater than the inside diameter of the said body member and having an apertured flange C, so that the said members may be simultaneously attached to the tank top as previously described for the body member 1.

Figure 2:
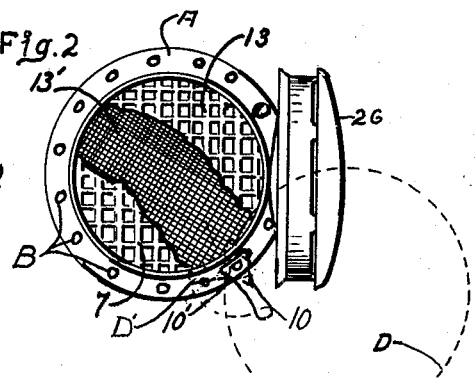
Fig. 2 is a plan view of Fig. 1, parts removed for convenience of illustration.
Figure 3:
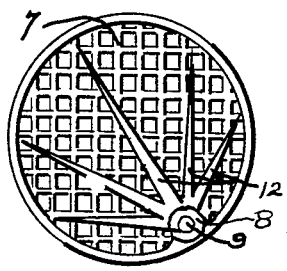
Fig. 3 is an inverted plan view of the screen.

Positioned on the lower end of the said neck member 5, is a tongue 6, integrally connected and adapted to engage snugly in an annular groove in a disk 7, the said disk being perforated as shown in Figures 2 and 3 and rockably arranged as hereinafter described.

Extending from one side of the disk, is a hub element 8 apertured to receive a pin 9 rigidly engaging thereon, the said pin extending upward and being trunnioned in the flange portion of the neck and body members and having a lever 10 secured to the upper end thereof as turning means for the pin.

As a means for tensioning the disk to snug engagement with the tongue of the neck member, a spring 11 is placed on the upper end portion of the pin and adapted to tension between the flange and the levers as raising means for the pin and the disk attached thereto; to rock the said disk from engagement with the neck to a possible position shown by dotted lines D, in Figure 2, I first open the lid then by pushing downward on the lever for the purpose of disengaging the groove and tongue elements, the said disk is free to rock to one side as accessible means through the neck into the tank and when rocked from engagement, the lever will function as means to prevent the lid from closing on the body portion 1, by an extension 10", as rocked to the position shown by dotted lines D'.

Positioned on the under side of the said disk 7, is a plurality of web members 12, radially extending from the hub 8, the purpose of which is to properly support the oppositely disposed portion of the disk 7, from the said hub.

Placed on the upper side of the said disk 7, is a perforated disk 13, and between said disks is positioned a woven wire fabric member 13'; the said member covering the entire area of the disks and being woven of fine copper wire, by which means circulation may be had through the said plates; the wire fabric will function as a fire proof means to avoid the flames passing therethrough should combustion take place on the outer side with reference to the position of the valve on the tank.

The cover for the body portion 1 consists of a housing 14 having a gasket 15, imbedded in the peripheral edge thereof as an air tight closing means for the joint E, between the housing and the body member.

As a means to allow for varying thickness of the gasket when the lid uniformly rests on the body member, I have provided an elongated slot 16, for the hinge engagement, by which means the said lid is free to raise and lower as the gasket may require.

Positioned in the lid is a duct 17 formed by a wall 18, having a mouth as an inlet as shown at F, at the other end of the duct is a check valve element consisting of a disk 19 adapted to seat in an opening 20 as closing means therefor; the said disk having a hollow stem 21, concentrically positioned and axially extending therefrom.

As a means to add weight to the disk member the stem thereof being hollow as at 21' is means to receive molten lead and being filled therewith to a consistency required.

The stem of the disk is adapted to slidably engage in an apertured guide 22, the said guide being supported by a plurality of arms 23, radially extending therefrom and connecting to the inside peripheral wall of the seat opening.

To remove the disk and reseat the same, I have provided an opening 24, in axial alignment therewith through which the said disk will pass and access be had to the valve seat for reseating the same, the said opening is provided with a lid 25, and means for securing the same thereto in an airtight manner.

Figure 4:
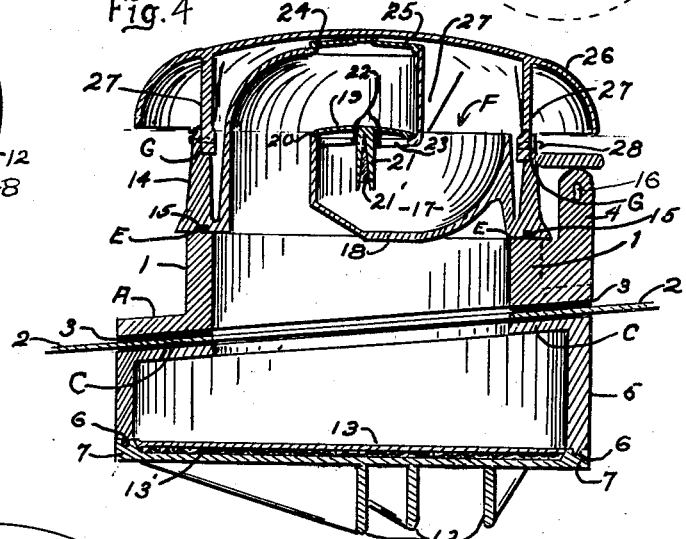
Fig. 4 is an enlarged sectional view diametrically taken.
Figure 5:
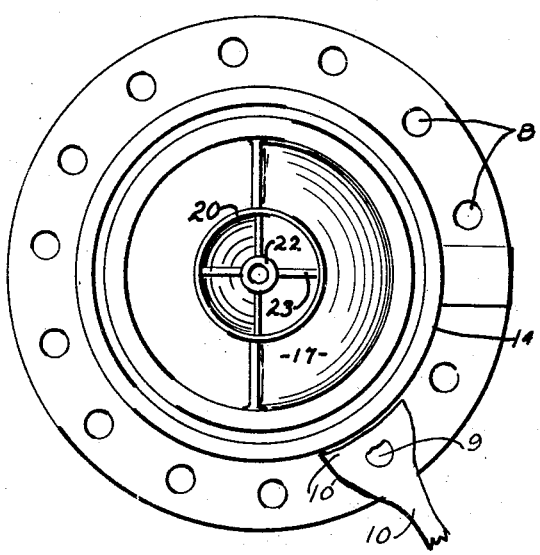
Fig. 5 is a plan view of the lid with the hood removed.

Positioned on the lid is a hood 26, functioning as a weather proof covering and being spaced therefrom by a plurality of leg members 27 integrally connected and adapted to seat on an annular shoulder as shown at G, in Figure 4 and secured thereto by pins 28, respectively.

Such modifications may be employed as lie within the scope of the appended claims; having fully described my invention what I claim as new and desire to secure by Letters Patent is:

1. In an automatic vapor check valve, a valve mechanism of the class described comprising, a body portion and a neck portion oppositely positioned on the top of a tank and in registry with each other, a screen rockably arranged and adapted to engage on the bottom of the neck portion and means to rock the screen from the exterior of the tank, a lid having a valve therein, a hood for the lid, the hood being spaced from the lid but secured thereto.

2. In an automatic check valve, in a fireproof feature for a valve of the class described, the valve having an annular body and a cover hingedly connected, an annular neck portion in registry with the annular body portion, the body and the neck portion being connected to the top of a tank that is intermediately positioned thereto, a screen pivotally connected to the neck and adapted to rock to and from engagement with the same, a pin and a lever to rock the screen, the pin having a spring as tensioning means for close engagement of the screen to the neck member when the screen is rocked to engagement therewith, means on the lever to prevent disengaging the screen when the lid is closed and the same said means to prevent closing of the cover until the screen is closed.

3. In an automatic check valve, in a fireproof screen for a valve mechanism of the class described, the valve consisting of a body portion having a flange as a connecting means to a tank, and a lid having a duct therein, a valve for the duct, means to add weight to the disk of the valve, a hood covering for the outer end of the duct, a neck member having a flange by which means the neck is attached to a tank opposite the body member and in registry therewith, a screen member pivotally connected to one side of the neck so that the screen will rock transversely to the neck as opening and closing means therefor, the screen consisting of a pair of perforated disks and a finely woven wire fabric positioned between the disks as supporting means therefor, the perforations of the disk members being in registry so that circulation may be had therethrough, a pin by which the screen is pivotally mounted and rocked, a lever on the opposite end of the spring as rocking means therefor, and a spring between the lever and the flange of the body portion, the spring to cause tight engagement of the screen to the end of the neck member, an annular groove on the inner face of the screen and an annular tongue on the end of the neck member by which means the joint between the screen and the neck member is sealed all as and for the purpose specified.

In testimony whereof I affix my signature.

PHILIP B. DRANE.